United States Patent Office 3,243,265
Patented Mar. 29, 1966

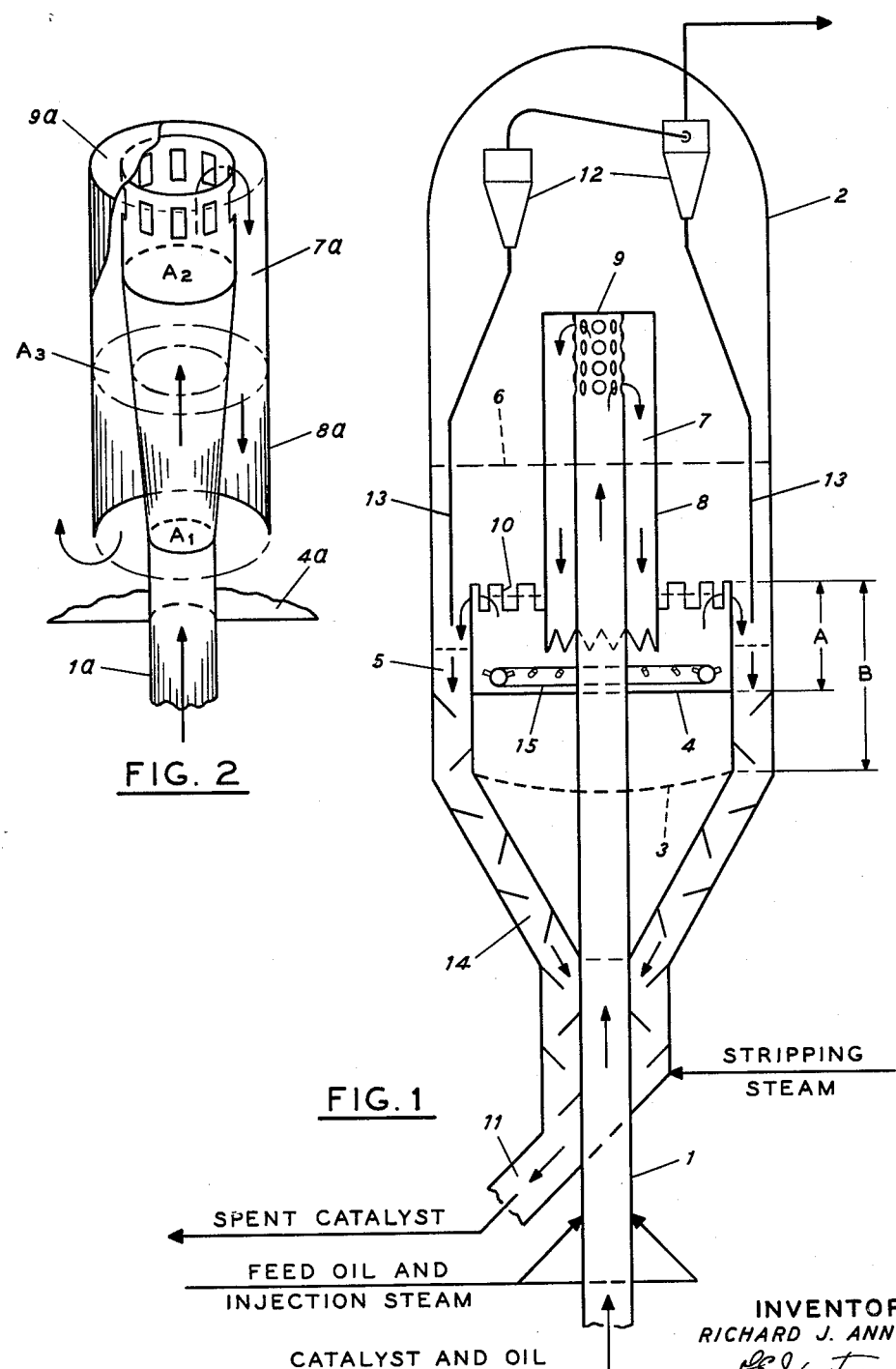

3,243,265
CATALYTIC CRACKING APPARATUS
Richard J. Annesser, Berkeley, Calif., assignor to Chevron Research Company, a corporation of Delaware
Filed Dec. 3, 1962, Ser. No. 241,919
1 Claim. (Cl. 23—288)

This invention pertains to improvements in catalytic conversions, particularly catalytic cracking of hydrocarbons to lighter boiling fractions such as gasoline.

In accord with current commercial practice, catalytic cracking is accomplished in fluid bed units by passage of the vaporized hydrocarbons at relatively low superficial velocities of the order of two or three feet per second upwardly through a relatively dense fluidized bed of the catalyst in finely divided or powdered condition. It has also been proposed, for example, as described in Belchetz Patent 2,312,230 and Andrews Patent 2,881,129, to practice catalytic cracking at substantial higher upward vapor velocities of the order of ten feet per second and higher. The concentration of the catalyst particles, and contact or resident times of the individual catalyst particles is considerably less under such conditions than in the dense fluid bed case. In upflow reactors commonly referred to as "transfer line" reactors, the contact time of the catalyst particles in the reaction zone is somewhat greater than that of the vapor by reason of the "slippage" factor.

I have ascertained, contrary to what would be expected and predicted from the prior art, that efficient conversions such as catalytic cracking could be effected advantageously under certain controlled conditions wherein the suspension of catalyst is first caused to flow upwardly and then downwardly through a path of substantial length prior to discharge of the mixture into a solids-vapor disengaging zone.

A primary object of my invention is the provision of an improved apparatus and process for the practice of transfer line cracking. The apparatus provided by my invention is characterized by its compact arrangement and low silhouette with consequent economy in construction costs and vertical space utilization.

While there are brief references to downward in potential substitution of upward flow of the vapors in the prior art, such as in the above-cited Andrews et al. patent, pertaining to transfer line reactors, it has been evident to the skilled in the art that the contact times of the catalyst particles under this condition would be even less than the relatively brief contact time within the reaction zone of the vapor particles, and for this and possibly other reasons, no incentive has been evident for actual commercial utilization thereof.

While my invention is not confined to any particular theory of operation, the unexpected efficient conversion accomplished thereby, despite the ostensibly undesirable decrease in catalyst contact time in downward flow, may be explained as follows. I have observed and demonstrated that a catalyst-gas mixture flowing upwardly through an elongated vertical path may be reversed in direction of flow without detrimental separation of the catalyst in the reversal section of the path. Subsequent to or concurrent with the reversal in flow, the catalyst particles are effectively re-entrained in a smooth flow vapor stream. While the residence time of the catalyst particles in a given length of the downward flow path is less than in a similar length of path in an upflow stream, relative movement and shift of the entrained particles in the flowing vapor and efficient catalytic contacting is accomplished in both instances. Also, since the free settling rates of indiscriminately sized catalyst particles differ over a wide range, the alternate upward and downward flow results in a more efficient contacting when such particles and not uniformly sized catalytic particles are used.

Operating conditions maintained in the practice of my invention are adjusted and determined in accordance with the relative lengths of the total path of flow in both upward and downward direction.

Separation of the entrained catalyst particles from the vapor mixture transported at the velocities employed in transfer line cracking involves the discharge of the latter into a separation zone of relatively large horizontal area wherein the vapor velocity is greatly reduced. In the solids-vapor separating zone, a minimum height of "disengaging zone" must be provided extending above the surface of the mass of separated catalyst for efficient and optimum disengagement of the solid particles.

In accord with my invention, both the upward and downflow paths are extended a substantial distance upwardly into the disengaging zone, thereby accomplishing effective space utilization, particularly advantageous for the conversion of conventional fluid bed reactors to the practice of my process.

Further features and advantages of the invention will be apparent from the following description of the embodiments illustrated in the appended drawing.

The embodiments shown in the drawing illustrate the application of the invention in converting a cyclic system employing a "fluidized" dense bed reactor and regenerator such as illustrated in FIG. 2 of Packie Patent 2,589,124 to a transfer line reactor. In the drawing, portions of the complete cyclic system such as the fluidized dense bed regenerator and interconnecting U-shaped catalyst transfer lines are not illustrated since those employed are conventional, and in these regards, the prior art practices as illustrated, for example by the Packie patent, are well understood.

Referring to the drawing, riser 1 serves to conduct a suspension of the catalyst particles entrained in the vaporized feed stock thru a reaction zone. This riser, in accord with prior practice, normally terminates within the reactor vessel 2 in a distributing grid 3 indicated by a dotted line. An imperforate membrane or plate 4 is disposed above or substituted for the gird 3 and extends to the inner annular wall of the stripping zone 5.

Riser 1 provides an upwardly extending path for the flow of the suspension and is extended for a substantial distance into the reactor through the space normally occupied by the dense fluidized bed and the disengaging zone or confined space there above. A normal level for the dense phase is indicated by dotted line 6.

A downwardly extending annular path 7 is provided for the flow of the suspension and continuance of the cracking reaction by cylinder 8 having its upper end closed by plate 9, and which is superimposed above and concentric to the central riser 1.

As illustrated, the suspension of catalyst particles and vaporized feed stock undergoes a reversal in the direction of flow on exiting from the vertically extending path of riser 1 and then flows downwardly through the annular section of the reaction zone bounded by the outer wall of the central riser 1 and the inner wall of the cylinder 7.

Cracking is initiated in the cyclic system when the hot regenerated catalyst is mixed with the feed stock either in the liquid or vaporous phase, and the total path of reaction includes the upflow section of the riser 1 and the downflow path which must be of a substantial length to attain the desired degree of contacting and conversion. The length of the path in downward flow preferably constitutes as a minimum 20% of the total path of reaction thus provided.

Operating conditions in the practice of the process are adjusted in accordance with the total length of reaction path and time of oil and catalyst contact provided by the successive upflow and downflow sections. It has been ascertained that the length of time oil is in contact with the catalyst and the catalyst/oil feed weight ratio are key considerations. Since the cracking reaction is attended with an increase in gas volume, in accord with the preferred embodiment of my invention illustrated in FIG. 2, cross-sectional area of the paths progressively increases in the direction of flow to accommodate the increase in gas volume and promote a uniform linear velocity of the vapor.

The range of catalyst/oil feed weight ratio and selection of a preferred ratio are dependent upon various factors affecting the cyclic system, including heat balance considerations as described in the above-cited Belchetz patent, and these in turn determine the temperature of the catalyst and oil at the entrance to the cracking zone. Given a desired catalyst/oil feed weight ratio, the duration of time of contact of the catalyst and oil is determined by, among other factors, the lengths of the paths in upward and downward flow. A wide range of catalyst/oil feed weight ratios is feasible, and operative, a preferred range being a catalyst-to-oil feed weight ratio of 7–20 to 1, together with a preferred range of oil-catalyst contact time in the total reaction path of about 1 to 4 seconds. In the upflow path of the reaction zone, vapor and catalyst linear velocities are maintained within the range of about 15 to 40 feet per second with a restricted range of about 15 to 30 feet per second preferred, and catalyst mass velocities within the range of about 40 to 80 in terms of pounds of catalyst passing per second through a square foot area of the reaction path. In the downflow section all linear velocities are maintained within the range of about 5 to 40 feet per second with a range of about 15 to 20 being preferred and with a range of catalyst mass velocities of about 40 to 80. Within the range of the above variables, the density of the catalyst suspension is about 3 to 6 pounds per cubic foot. The temperature of the hot regenerated catalyst is in the range of 1000 to 1200° F., and usually within the more restricted range of about 1100 to 1150° F. The temperature of the suspension of catalyst in vapor at the exit of the reaction zone is within the range of about 875 to 1000° F., and usually within the more restricted range of 925 to 975° F. Space velocity is specified in terms of the weight of oil fed per hour to the weight of catalyst within the reaction zone and is maintained within the range of about 30 to 200 and preferably within the more restricted range of about 40 to 70. The foregoing space velocities are considerably higher than those normally employed in fluidized dense bed operations which are of the order of about 5 to 1. In addition to the advantage of high space velocity, my process exhibits other advantages over conventional fluid bed cracking including a more desirable yield distribution of products, particularly reduction in the quantity of coke deposit on the catalyst.

The catalyst employed preferably includes particles having a wide range of free settling rates since the degree of catalyst to vapor contact and optimum catalyst distribution in the alternate up and down flow characteristic of the process is enhanced thereby. Commercially available powdered cracking catalysts having a particle distribution with 60 to 90 weight percent in the 40 to 80 micron range are particularly suitable in the practice of the process.

For a unit of specified capacity in barrels of feed converted per operating day, maintenance of the variables within desired limits is dependent upon appropriate dimensioning and design of the components of the apparatus, as illustrated by the example given hereafter of a unit having a feed capacity of 27,000 b.p.o.d. (barrels per operating day).

Again referring to FIG. 1, the suspension of catalyst particles and vapor converted to the desired extent exits from the bottom of the annular downward path into the solids-vapor disengaging or separation zone constituted by the confined space defined by the inner walls of the reaction vessel. A major reduction in the linear velocity of the vapor ensues by reason of the relatively large cross-sectional area of the disengaging zone. The height of this zone is preferably such that the quantity of particles entrained with the vapor and separated by the cyclone separators 12 is reduced to a minimum. Tail pipes 13 leading from the bottom of the cyclone separators 12 are arranged to discharge recovered fines into the catalyst stripping zone 14. The mass of separated catalyst collecting on the horizontal partition 4 overflows through the notched weir 10 into the annular steam stripping zone 11, from which it is recycled to the regenerator side of the cyclic system through line 11. The mass of catalyst on partition 4 is maintained in a fluid flowing condition by the effluent vapor. A supplementary fluidizing medium, such as steam, may be introduced by a suitable distributing means such as steam ring manifold 15 shown as positioned above partition 4 and extending through the peripheral zone above the outer edge of partition 14 to maintain the catalyst in this zone in a free flowing condition. In addition, or as an alternative, partition 4 may be appropriately perforated and steam introduced through the openings to maintain the desired free flowing condition of the catalyst.

A preferred embodiment of the invention is illustrated in FIG. 2, which is similar but differs from the FIG. 1 embodiment in that the central feed conduit 1a progressively increases in cross-sectional area as illustrated in the direction of flow to accommodate the increase in gas volume resulting from the cracking reaction and promote a more uniform linear velocity of the suspension. Components of FIG. 2 having a similar function to a component of FIG. 1 are numbered correspondingly with a letter suffix.

The following is an example of a commercial reactor design in accord with FIG. 2 having a total fresh plus recycle feed capacity of 27,000 b.p.o.d. of a gas oil having an average API gravity of 23°.

Dimensions of unit components:

| | Feet |
|---|---|
| Reactor vessel (2) | |
| Diameter | 20.0 |
| Height (bottom of cone to cyclone inlets) | 50 |
| Central riser (1) | |
| Diameter: | |
| Initial | 3.75 |
| Apex of cone | 3.75 |
| Base of cone | 7.0 |
| Total length | 58 |
| Length apex to base | 29 |
| Return path cylinder | |
| Diameter | 10.5 |
| Length | 20 |

Optimum design operating conditions for this unit are:

(1) Catalyst/oil feed weight ratio _____ 10:1
(2) Contact time in riser _____sec.___ 3

My invention is preferably practiced in a cyclic operation, wherein the spent catalyst is regenerated under fluidized bed conditions in accord with usual commercial practice as above indicated. However, in substitution therefor, the spent catalyst may be regenerated in dilute phase as contemplated in the above-cited Belchetz patent, or in a regenerator substantially similar in arrangement to the above-described arrangement for the cracking side of the cyclic system. Also, the described apparatus may be readily modified to provide a plurality of paths in both upward and downward flow. Such modifications are embraced within the scope of the invention and claim appended hereto.

I claim:

In a catalytic hydrocarbon conversion reactor vessel comprising an enclosed, generally cylindrical and vertically elongated external shell forming at the upper portion thereof a disengaging zone for the separation and removal from said zone of oil vapor conversion products and spent catalyst, at least one elongated catalyst-oil inlet conduit forming an upward confined cracking reaction path and extending vertically into said zone from below said zone, a vertically disposed elongated flow reversal conduit having a closed top and an open bottom concentrically surrounding a substantial upper portion including the top of said inlet conduit and forming with said upper portion an annulus around said upper portion, said annulus communicating at the upper end thereof with the interior of said inlet conduit and at the lower end thereof with the interior of said shell, said annulus being a downward confined cracking reaction path, means for separating oil vapors and catalyst emerging from the lower end of said annulus, means for withdrawing said separated oil vapors from said shell, and means for withdrawing said separated catalyst from said shell, the improvement which comprises:

means located at said upper portion of said inlet conduit for increasing residence time of upwardly flowing vapor and catalyst particles in said upper portion of said inlet conduit and for increasing residence time of downwardly flowing vapor and catalyst particles in said annulus, said means comprising an upper portion of said inlet conduit within said flow reversal conduit having a cross-sectional area progressively increasing in the upward direction, and forming with said flow reversal conduit a cross-sectional area for said annulus progressively increasing in the downward direction.

References Cited by the Examiner

UNITED STATES PATENTS 2,697,686  12/1954  Leffer _____ 208—147
2,871,186  1/1959  Francisco et al. _____ 208—147

DELBERT E. GANTZ, *Primary Examiner.*

ALPHONSO D. SULLIVAN, *Examiner.*

P. P. GARVIN, H. LEVINE, *Assistant Examiners.*